(12) United States Patent
Weng et al.

(10) Patent No.: US 6,779,011 B2
(45) Date of Patent: Aug. 17, 2004

(54) SYSTEM FOR PERFORMING MULTIPLICATION AND DIVISION IN GF($2^{2M}$)

(75) Inventors: Lih-Jyh Weng, Shrewsbury, MA (US);
Dana Hall, Hopkinton, MA (US);
Christine Imrich, Cambridge, MA (US)

(73) Assignee: Maxtor Corporation, Longmont, CO (US)

( * ) Notice: Subject to any disclaimer, the term of this patent is extended or adjusted under 35 U.S.C. 154(b) by 593 days.

(21) Appl. No.: 09/796,051

(22) Filed: Feb. 28, 2001

(65) Prior Publication Data

US 2002/0156823 A1 Oct. 24, 2002

(51) Int. Cl.[7] .................................................. G06F 7/72
(52) U.S. Cl. ....................................................... 708/492
(58) Field of Search ................................. 708/492, 491

(56) References Cited

U.S. PATENT DOCUMENTS

| | | | |
|---|---|---|---|
| 4,587,627 A | | 5/1986 | Omura et al. |
| 4,989,171 A | * | 1/1991 | Hollmann ................ 708/492 |
| 6,052,704 A | * | 4/2000 | Wei ............................ 708/492 |
| 6,343,305 B1 | * | 1/2002 | Ko.cedilla. et al. ......... 708/492 |
| 6,389,442 B1 | * | 5/2002 | Yin et al. ................... 708/495 |
| 2001/0007111 A1 | * | 7/2001 | Blake et al. ................ 708/492 |

OTHER PUBLICATIONS

S. Oh, C.H. Kim, J. Lim and D.H. Cheon, "Efficient Normal Basis Multipliers in composite Fields," IEEE Transactions on Computers, vol. 49, No. 49,pp. 1133–1138, Oct., 2000.

R. Mullin, I Onyszchuk, S.A. Vanstone, and R. Wilson, Optimal NOrmal Basis in GF(pn), Discrete Applied Math., vol. 22, pp. 149–161, 1988/1989.

B. Suar, and C.K. Koc, "An Efficient Optimal Normal Bais Type II Multiplier," IEEE Trans. on Computers, vol. 50, No. 1, Jan. 2001.

* cited by examiner

*Primary Examiner*—David H. Malzahn
(74) *Attorney, Agent, or Firm*—Cesari and McKenna, LLP

(57) ABSTRACT

A system determines the multiplicative inverse of $A \in GF(2^{2M})$ by representing A using a selected basis in which basis elements are squares of one another, and performing various operations that involve raising A to powers of 2 as cyclic rotations of A. The system also performs multiplication operations over $GF(2^{2M})$ or subfields thereof by calculating the coefficients of the product of two elements A and B that are represented using the selected basis as combinations of the coefficients of cyclically rotated versions of A and B. The system further utilizes a relatively small look-up table that contains the multiplicative inverses of selected elements of a subfield of $GF(2^{2M})$. The system may then cyclically rotate the multiplicative inverse values read from the table to produce the multiplicative inverses of the remaining elements of the subfield. Thereafter, as applicable, the system further manipulates the multiplicative inverse of the subfield element, to produce the multiplicative inverse of the desired element of $GF(2^{2M})$. Using the selected basis, elements of $GF(2^{2M})$ that are elements of the subfields have m lowest-order coefficients that are duplicates of the m highest order coefficients. Each element in the look-up table can thus be represented using only m bits, and the table can be entered with m bits.

30 Claims, 6 Drawing Sheets

SYSTEM FOR PERFORMING MULTIPLICATION AND DIVISION IN GF $(2^{2M})$

BACKGROUND OF THE INVENTION

1. Field of the Invention

This invention relates to data error correction systems, and in particular to Galois Field division operations performed by the systems.

2. Background Information

Data stored on magnetic media, such as a magnetic tape and disks, are typically stored in encoded form, so that errors in the stored data can possibly be corrected. The errors may occur, for example, because of inter-symbol interference, a defect in the tape or disk, or noise. As the density of the data stored on the tape or disk increases, more errors are likely, and the system is required to correct greater numbers of errors. The speed with which the system corrects the errors is important to the overall speed with which the system processes the data.

Before a string of data symbols is recorded, it is mathematically encoded to form ECC symbols. The ECC symbols are then appended to the data string to form code words—data symbols plus ECC symbols—and the code words are then stored. When the stored data is to be accessed, the code words containing the data symbols are retrieved and mathematically decoded. During decoding any errors in the data are detected and, if possible, corrected through manipulation of the ECC symbols [For a detailed description of decoding see Peterson and Weldon, Error Correction Codes, 2d Edition, MIT Press, 1972].

Stored digital data can contain multiple errors. One of the most effective types of ECC used for the correction of multiple errors is a Reed-Solomon code [For a detailed description of Reed-Solomon codes, see Peterson and Weldon, Error Correction Codes]. With Reed-Solomon codes, the encoding and decoding operations are performed over a Galois Field, using Galois Field addition, multiplication and division operations.

Galois Field division is generally a time consuming operation that significantly lengthens the ECC encoding and decoding processes. The time it takes to perform error correction operations adversely affects the rate at which data can be retrieved from a storage device and supplied to a user or to a computer application that requires the data.

One way to perform a Galois Field division operation, B/A, where A and B are elements of the Galois Field $GF(2^Q)$, is to determine the multiplicative inverse of A and multiply B by the inverse. Finding the inverse of a Galois Field element is not particularly straightforward. One solution to determining the inverse is to test each element of the field, by multiplying the element by A. This is very time consuming, particularly with the larger Galois Fields that are used to protect the higher-density data.

Another solution is to use a look-up table that contains the multiplicative inverses. If a Galois Field $GF(2^{2M})$ is used, a $(2^{2M}-1)$-element look-up table is required. With many systems, it is undesirable to have such large look-up tables, which require both large amounts of storage space and relatively complex addressing circuitry.

A better solution is described in U.S. Pat. No. 4,975,876, which has a common inventor and is incorporated herein by reference. The system described in the '876 patent determines the multiplicative inverse of an element A of $GF(2^{2M})$ by first computing a conversion factor, $D=A^{2^M}$, and then multiplying A by D to produce an associated element $C=A^{2^M+1}$. The element C is also an element of a smaller Galois Field, $GF(2^M)$, which is a subfield of $GF(2^{2M})$. The system then determines the multiplicative inverse of C by entering a $(2^M-1)$-element look-up table. The system next converts the inverse of C, $C^{-1}=A^{-(2^M+1)}$, to the multiplicative inverse of A by multiplying $C^{-1}$ by the conversion factor D, to produce $A^{-(2^M+1)} * A^{2^M} = A^{-1}$, where "*" represents Galois Field multiplication.

The system described in the '876 patent works well and determines the multiplicative inverse of A relatively quickly, using a $(2^M-1)$-entry look-up table rather than the larger $(2^{2M}-1)$-entry table. The system, however, requires at least one relatively complex fall Galois Field multiplier to multiply together two 2M-bit symbols. A single multiplier may be used multiple times to multiply together A and D, and then $C^{-1}$ and D, or two of the multipliers may be used to perform the two multiplications. The multiplication operations, whether performed by one or two full Galois Field multipliers, involve manipulation of two 2M-bit symbols and are thus both relatively time consuming and complex.

We have devised an improved system that produces the multiplicative inverses of the elements of $GF(2^{2M})$ in fewer clock cycles and/or using less complex multipliers, and/or using smaller tables. We discuss the improved system below.

SUMMARY OF THE INVENTION

The invention is a system that determines the multiplicative inverse of $A \epsilon GF(2^{2M})$ by representing A using a selected basis and performing various operations that involve raising A to powers of 2 as cyclic rotations of A. The system also performs multiplication operations over $GF(2^{2M})$ or subfields thereof by calculating the coefficients of the product of two elements A and B that are represented using the selected basis as combinations of the coefficients of cyclically rotated versions of A and B.

The system utilizes a relatively small look-up table that contains the multiplicative inverses of selected elements of a subfield of $GF(2^{2M})$. The system may then cyclically rotate the multiplicative inverse values read from the table to produce the multiplicative inverses of the remaining elements of the subfield. Thereafter, as applicable, the system further manipulates the multiplicative inverse of the subfield element, to produce the multiplicative inverse of the desired element of $GF(2^{2M})$.

More specifically, the system represents the elements of $GF(2^{2M})$ using a selected basis in which each basis element is the square of the preceding basis element. Raising a field element to a power $2^k$ is then a cyclic rotation of the element by k bits. Further, multiplication of A*B, where B is also represented using the selected basis, is performed essentially by combining cyclically rotated versions of A and B, as discussed in more detail below.

The system thus raises A to the power $2^M$ by cyclic rotation of A, or the equivalent thereof, to produce the conversion factor $A^{2^M}$ and multiplies the factor by A in the manner discussed above to produce $A^{2^{M+1}}$, which is an element of the subfield $GF(2^M)$. The multiplicative inverse of this element may then be determined by entering a look-up table that contains the multiplicative inverses of elements of $GF(2^M)$. Using the selected basis, elements of $GF(2^{2M})$ that are elements of the subfield $GF(2^M)$ have m lowest-order coefficients that are duplicates of the m highest order coefficients. Each element in the look-up table can thus be represented using only m bits, and the table can be entered with m bits. Accordingly, the table and the associated circuitry are less complex than those required when the conventional basis is used to represent the elements.

After retrieving the multiplicative inverse from the table, the system then multiplies it by the conversion factor to produce $A^{-1}$. As discussed, the multiplication operations are readily performed using cyclically rotated versions of the elements.

The system may further manipulate $A^{2^M+1}$ by raising the element to selected powers of 2, to produce elements that are also elements of smaller subfields of $GF(2^{2M})$, e.g., $$GF\left(2^{\frac{M}{2}}\right)$$

and so forth. The system may then use correspondingly smaller look-up tables.

The size of the tables can be even further reduced by one-half or more by including therein only the multiplicative inverses of the elements of a given subfield that have one or more coefficients set to particular values. As an example, the table may include the multiplicative inverses of the elements that have the highest-order coefficient set to a 1. To enter the table, the system raises the remaining elements of the subfield to powers of 2, that is, cyclically rotates the elements to the left, to produce elements that have the particular coefficients set to the desired pattern. Thereafter, the system rotates the multiplicative inverse read from the table by the same number of bits to the right, or raises the result to powers of $$\frac{1}{2},$$

to produce the multiplicative inverse of the desired element of the subfield. As appropriate, the system further manipulates the result to produce the multiplicative inverse of the associated element of $GF(2^{2M})$.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
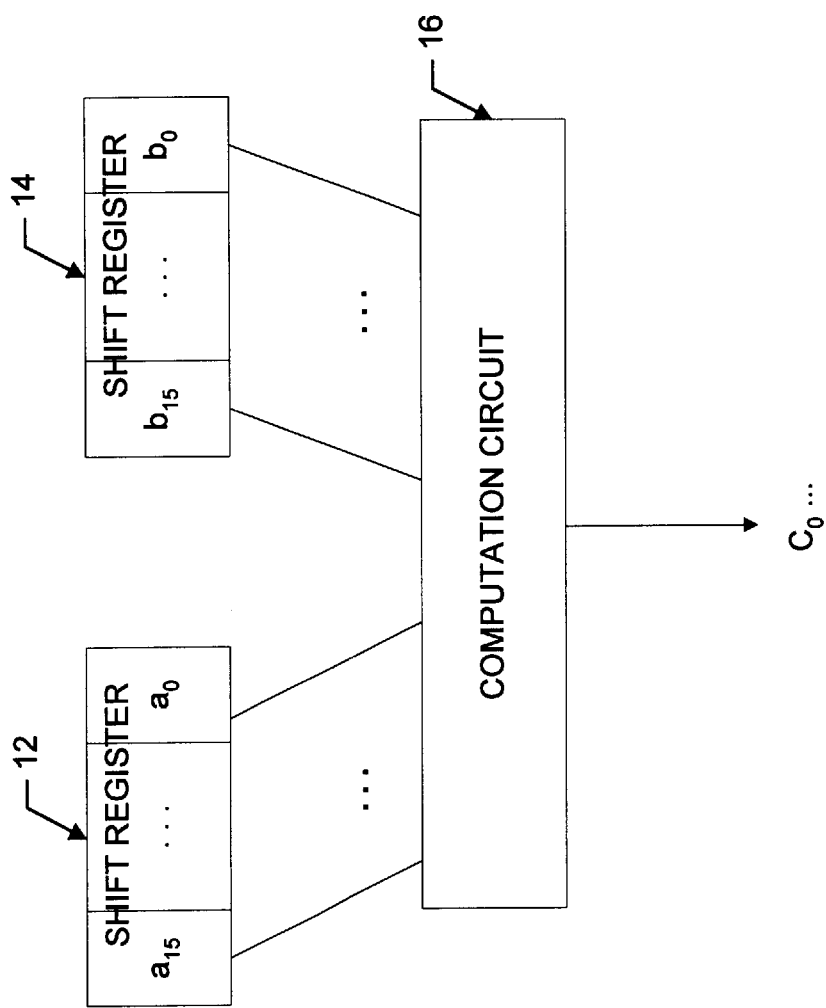
FIG. 1 is functional block diagram of a Galois Field multiplier constructed in accordance with the invention.

To speed-up operations and reduce the complexity of hardware, we select a polynomial and a basis over $GF(2^{2M})$ such that a multiplication operation $A*B=C$, where the symbols are represented by their coefficients, for example, $A=a_{15}, a_{14}, a_{13}, \ldots, a_1, a_0$, and $B=b_{15}, b_{14}, b_{13}, \ldots, b_1, b_0$, involves producing for the coefficient $c_0$ a value that is a combination of the coefficients of A and B, and for the coefficients $c_1, c_2 \ldots c_{15}$ the same combination of cyclically shifted versions of the coefficients of A and B. As discussed in more detail below with reference to FIG. 1, the multiplication operation is readily and quickly performed in hardware. First, however, we discuss the underlying theory by way of example over $GF(2^{16})$.

A. The Selected Basis

In the example, the elements of $GF(2^{16})$ are generated using the primitive polynomial:

$$g(x)=x^{16}+x^{15}+x^{13}+x^{12}+x^{11}+x^{10}+x^8+x^7+x^5+x^3+x^2+x+1$$

The field elements of $GF(2^{16})$ are conventionally represented using the basis elements:

$$\alpha^0 \alpha^1 \alpha^2 \alpha^3 \alpha^4 \alpha^5 \alpha^6 \alpha^7 \alpha^8 \alpha^9 \alpha^{10} \alpha^{11} \alpha^{12} \alpha^{13} \alpha^{14} \text{ and } \alpha^{15}.$$

The element $\alpha^5$=(0000 0000 0010 0000) and the element $\alpha^{4098}$=(0100 0001 0000 1000) or the sum of:

$$(0100\ 0000\ 0000\ 0000)+(0000\ 0001\ 0000\ 0000)+(0000\ 0000\ 0000\ 1000)=\alpha^{14}+\alpha^8+\alpha^3$$

where rounded brackets are used herein to indicate field elements that are represented using the conventional basis. The same field elements may be represented using a selected, or normal, basis of:

$$\alpha^1 \alpha^2 \alpha^4 \alpha^8 \alpha^{16} \alpha^{32} \alpha^{64} \alpha^{128} \alpha^{256} \alpha^{512} \alpha^{1024} \alpha^{2048} \alpha^{4096} \alpha^{8192} \alpha^{16384} \text{ and } \alpha^{32768},$$

where each basis element is the square of the next lowest basis element. A given field element is represented using the selected basis as the combination of the selected basis elements that reproduce the element in the conventional basis. For example, the element $\alpha^5$=[0000 1001 1001 0000], where the square brackets are used herein to indicate that the element is represented using the selected basis. The element $\alpha^5$ is thus the sum of the basis elements $\alpha^{2048}+\alpha^{256}+\alpha^{128}+\alpha^{16}$ or:

[0000 1000 0000 0000] +

[0000 0001 0000 0000] + [0000 0000 1000 0000] +

[0000 0000 0001 0000] = [0000 1001 1001 0000]

Using the conventional basis the sum of the field elements $\alpha^{2048}, \alpha^{256}, \alpha^{128}, \alpha^{16}$ is:

(1100 0101 1001 0100)+(0001 1110 1110 0110)+

(0110 0110 1111 1101)+(1011 1101 1010 1111)=

(0000 0000 0010 0000)

which confirms that the representation of the element in the selected basis is correct. The representation of the element $\alpha^{4098}$=(0100 0001 0000 1000) in the selected basis can be determined from the conventional representation by taking the conventional basis elements that are included therein:

(0100 0000 0000 0000)+(0000 0001 0000 0000)+(0000 0000 0000 1000)

or $\alpha^{14}+\alpha^8+\alpha^3$ and summing the representations of these elements in the selected basis:

$$\alpha^{14}=[0110\ 1001\ 1110\ 0000]$$

$$\alpha^{8}=[0000\ 0000\ 0000\ 1000]$$

$$\alpha^{3}=[0111\ 1000\ 0000\ 0000]$$

and the sum is $[0001\ 0001\ 1110\ 1000]=\alpha^{4098}$.
To then convert back to the conventional basis, determine the combination of elements that produce the symbol of interest in the selected basis:

$$\alpha^{4098}=\alpha^{4096}+\alpha^{256}+\alpha^{128}\alpha^{64}+\alpha^{32}+\alpha^{8}$$

and using the conventional representations:

$$\alpha^{4096}=(0001\ 0000\ 0100\ 0010)$$

$$\alpha^{256}=(0001\ 1110\ 1110\ 0110)$$

$$\alpha^{128}=(0110\ 0110\ 1111\ 1101)$$

$$\alpha^{64}=(1011\ 1011\ 1000\ 0001)$$

$$\alpha^{32}=(1001\ 0011\ 1101\ 0000)$$

$$\alpha^{8}=(0000\ 0001\ 0000\ 0000)$$

the sum is $(0100\ 0001\ 0000\ 1000)$, or $\alpha^{4098}$.
As discussed in more detail below, using the selected basis simplifies certain Galois Field operations. For example, squaring an element represented using the selected basis is a cyclic rotation of the symbol by one bit. The element $\alpha^{6}=[1111,\ 0000,\ 0000,\ 0000]$ is squared by cyclically rotating the symbol to the left:

$$(\alpha^{6})^{2}=[1110,\ 0000,\ 0000,\ 0001]=\alpha^{12}.$$

Raising an element to a power $2^{k}$ is thus a cyclic rotation of the symbol by k bits to the left. Accordingly, raising an element to the power 256, or $2^{8}$, is a cyclic rotation to the left of eight bits.

B. Multiplication

Using the selected basis representations, multiplication of an element A by an element B, that is, A*B=C, is performed by first determining the coefficient $c_0$ as a sum of products of the coefficients of A and B:

$$c_0=a_0*(b_3+b_5+b_6)+a_1*(b_7+b_8)+a_2$$

$$*(b_3+b_5+b_6+b_9+b_{10}+b_{11}+b_{14}+b_{15})+a_3$$

$$*(b_0+b_2+b_4+b_6+b_7+b_9+b_{12}+b_{15})+a_4$$

$$*(b_3+b_5+b_9+b_{11})+a_5$$

$$*(b_0+b_2+b_4+b_6+b_7+b_9+b_{10}+b_{11})+a_6$$

$$*(b_0+b_2+b_3+b_5+b_{10}+b_{11}+b_{13}+b_{15})+a_7$$

$$*(b_1+b_3+b_5+b_{10}+b_{12}+b_{13})+a_8$$

$$*(b_1+b_{10})+a_9$$

$$*(b_2+b_3+b_4+b_5+b_{11}+b_{12}+b_{13}+b_{14})+a_{10}$$

$$*(b_2+b_5+b_6+b_7+b_8+b_{13})+a_{11}$$

$$*(b_2+b_4+b_5+b_6+b_9+b_{14})+a_{12}$$

$$*(b_3+b_7+b_9+b_{14})+a_{13}$$

$$*(b_6+b_7+b_9+b_{10})+a_{14}$$

$$*(b_2+b_9+b_{11}+b_{12})+a_{15}$$

$$*(b_2+b_3+b_6+b_{15})$$

The coefficient $c_1$ is determined by cyclically shifting the coefficients of each of A and B once to the left and combining them in the same manner:

$$c_1=a_1*(b_4+b_6+b_7)+a_2*(b_8+b_9)+a_3$$

$$*(b_4+b_6+b_7+b_{10}+b_{11}+b_{12}+b_{15}+b_0)+a_4$$

$$*(b_1+b_3+b_5+b_7+b_8+b_{10}+b_{13}+b_0)+a_5$$

$$*(b_4+b_6+b_{10}+b_{12})+a_6$$

$$*(b_1+b_3+b_5+b_7+b_8+b_{10}+b_{11}+b_{12})+a_7$$

$$*(b_1+b_3+b_4+b_6+b_{11}+b_{12}+b_{14}+b_0)+a_8$$

$$*(b_2+b_4+b_6+b_{11}+b_{13}+b_{14})+a_9$$

$$*(b_2+b_{11})+a_{10}$$

$$*(b_3+b_4+b_5+b_6+b_{12}+b_{13}+b_{14}+b_{15})+a_{11}$$

$$*(b_3+b_6+b_7+b_8+b_9+b_{14})+a_{12}$$

$$*(b_3+b_5+b_6+b_7+b_8+b_{15})+a_{13}$$

$$*(b_4+b_8+b_{10}+b_{15})+a_{14}$$

$$*(b_7+b_8+b_{10}+b_{11})+a_{15}$$

$$*(b_3+b_{10}+b_{12}+b_{13})+a_0*(b_3+b_4+b_7+b_0)$$

The coefficient $c_j$ is determined by cyclically shifting the coefficients of A and B by j bits, respectively, and combining them in the manner set forth above. The coefficients of A and B used to calculate $c_j$ are thus $a_{15+j\ mod\ 16} \cdots a_{0+j\ mod\ 16}$, and $\ldots b_{15+j\ mod\ 16} \cdots b_{0+j\ mold\ 16}$.

Referring now to FIG. 1, a Galois Field multiplier over $GF(2^{16})$ includes cyclic shift registers 12 and 14 that are loaded with the coefficients of the selected basis representations of A and B, respectively. The shift register 12 thus holds $a_{15}, a_{14}, \ldots a_0$, and shift register 14 holds $b_{15}, b_{14}, \ldots b_0$. A computation circuit 16 combines the coefficients of A and B as set forth above to produce $c_0$. The shift registers are then shifted one bit to the left, such that they hold $a_{14}, \ldots a_0, a_{15}$ and $b_{14}, \ldots b_0, b_{15}$, respectively. Next, the combination circuit again combines the coefficients to produce $c_1$, and so forth.

Figure 2:
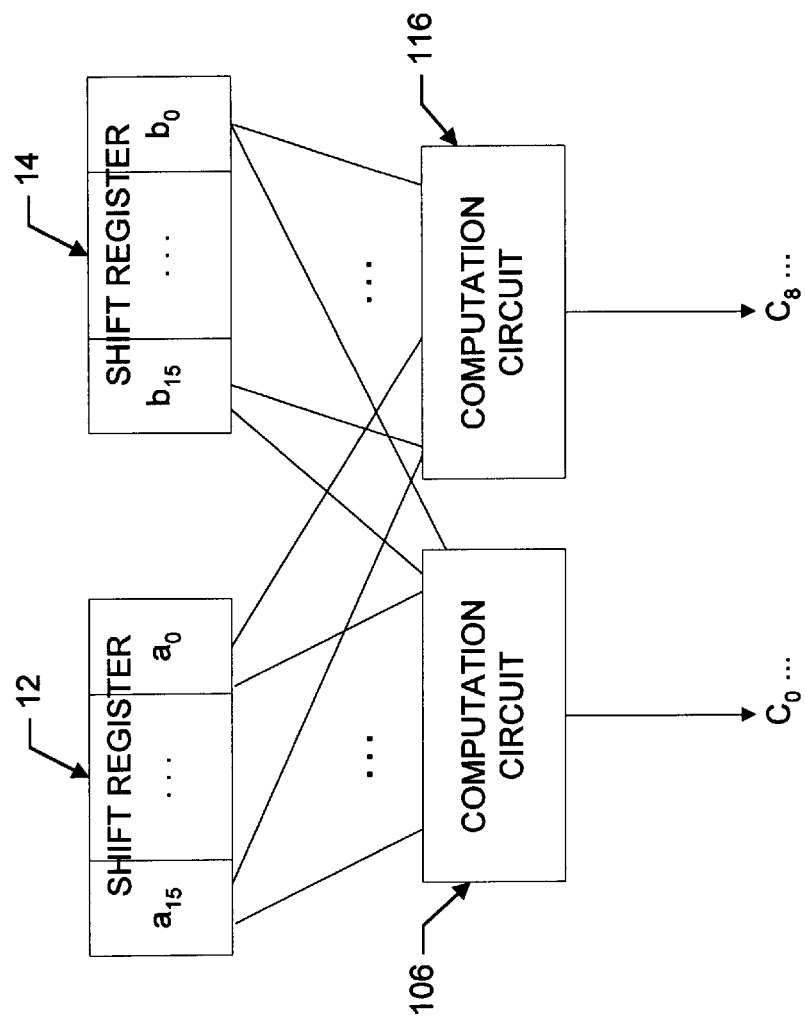
FIG. 2 is illustrates a functional block diagram of an alternative construction of the multiplier of FIG. 1.

Referring now to FIG. 2, to double the operating speed of the multiplier of FIG. 1, the computation circuit 16 is separated into two computation circuits 106 and 116. The combination circuit 106 produces the coefficients $c_0, c_1 \ldots c_7$ at the same time that the circuit 116 produces the coefficients $c_8, c_9 \ldots c_{15}$. Similarly, the combination circuit 16 may be further separated into four, eight or sixteen combination circuits that produce the corresponding coefficients in parallel, with associated reductions in the operating speed of the multiplier.

C. Subfields

Raising an element of $GF(2^{16})$ to a power k*257 produces an element that is also an element of the subfield $GF(2^8)$. As an example, elements of $GF(2^{16})$ that are also elements of the subfield $GF(2^8)$ are:

$$\alpha^{257}=[0,1,0,0,\ 0,0,0,0,\ 0,1,0,0,\ 0,0,0,0]=[<hex>4040]$$

$$\alpha^{514}=[1,0,0,0,\ 0,0,0,0,\ 1,0,0,0,\ 0,0,0,0]=[<hex>8080]$$

$$\alpha^{771}=[0,1,1,0,\ 1,1,0,1,\ 0,1,1,0,\ 1,1,0,1]=[<hex>6d6d]$$

Using the selected basis representations, the highest-order eight bits of a given symbol in $GF(2^8)$ are the same as the lowest-order eight bits of the symbol.

Raising an element of $GF(2^{16})$ to a power k*4369 produces an element that is also an element of the subfield $GF(2^4)$. As an example, elements of $GF(2^{16})$ that are also elements of the subfield $GF(2^4)$ are:

$\alpha^{4369}$=[0,0,0,1, 0,0,0,1, 0,0,0,1, 0,0,0,1]=[<hex>1111]

$\alpha^{8738}$=[0,0,1,0, 0,0,1,0, 0,0,1,0, 0,0,1,0]=[<hex>2222]

$\alpha^{13107}$=[1,0,1,1, 1,0,1,1, 1,0,1,1, 1,0,1,1]=[<hex>BBBB]

Using the selected basis representations, the highest-order four bits of a given symbol in $GF(2^4)$, that is, bits with the subscripts 15, 14, 13 and 12, repeat four times as bits 11, 10, 9, 8; bits 7, 6, 5, 4; and bits 3, 2, 1 and 0.

Raising an element of $GF(2^{16})$ to the power k*21845 produces elements of $GF(2^2)$, which are represented by symbols in which the two highest-order bits repeat eight times as bits 13, 12; bits 11, 10; . . . ; bits 1,0. For example, $\alpha^{21845}$=[0,1,0,1, 0,1,0,1, 0,1,0,1, 0,1,0,1]=[<hex>5555]

$\alpha^{43690}$=[1,0,1,0 1,0,1,0, 1,0,1,0, 1,0,1,0]=[<hex>AAAA]

D. Systems for Determining Multiplicative Inverses

Using the selected basis and the elements of the various subfields, we have developed systems for determining the inverse of an element of $GF(2^{2M})$ that are efficient in terms of both the hardware and the size of an associated look-up table. The circuits are discussed in terms of examples in $GF(2^{16})$.

Figure 3:
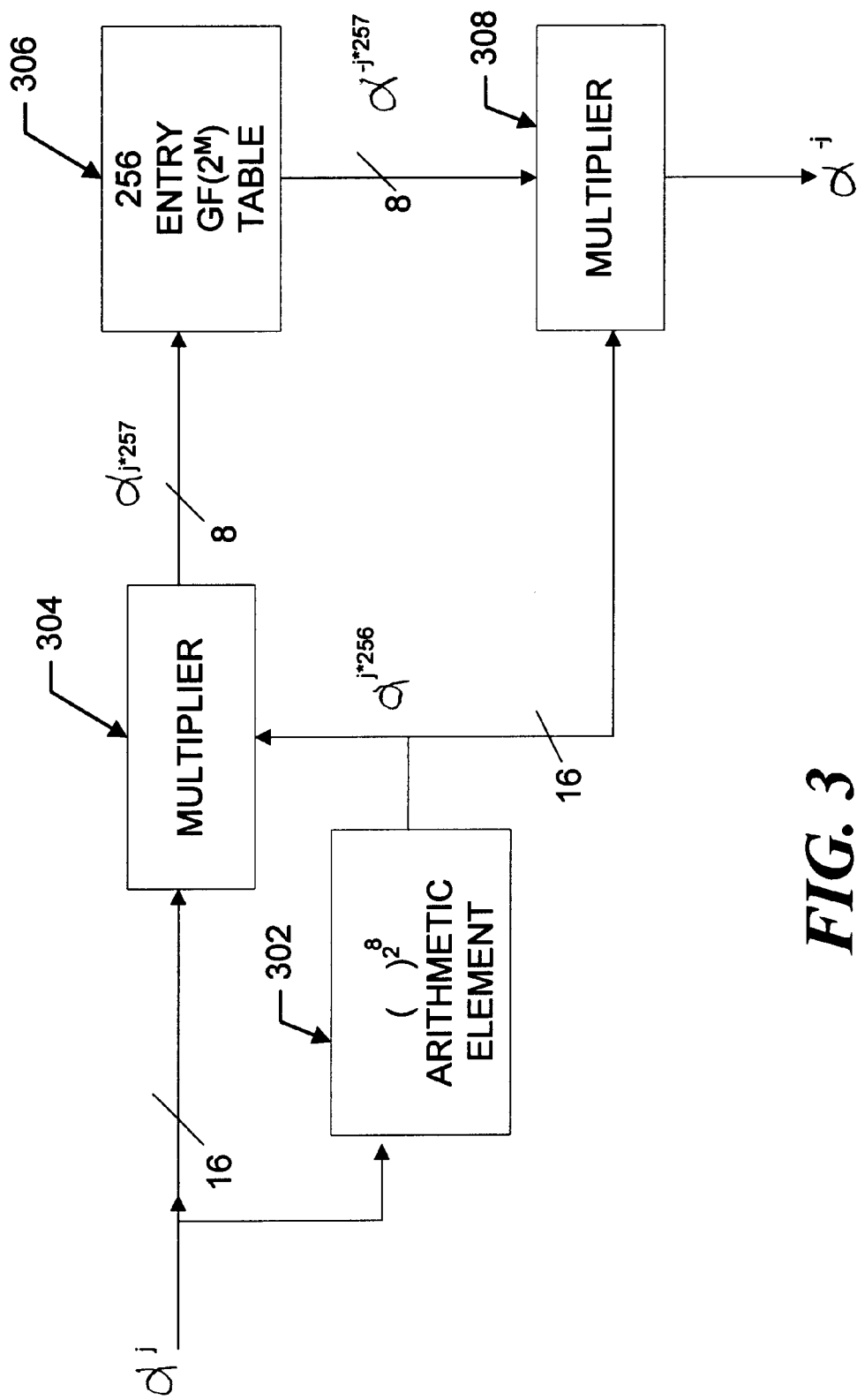
FIG. 3 is a functional block diagram of a system for determining multiplicative inverses in $GF(2^{2M})$ that uses the multipliers of FIGS. 1 and 2.

Referring to FIG. 3, a circuit for determining the multiplicative inverse of an element $A=\alpha^j$ of $GF(2^{16})$ includes an arithmetic element 302, such as a cyclic rotator, barrel shifter or multiplexer, that is hardwired to supply a symbol that is the equivalent of raising the element $\alpha^j$ to the power 256, or $2^8$, that is, cyclically rotating $\alpha^j$ to the left by 8 bits. The "rotation" is accomplished with essentially no delay. The register 302 thus supplies the element $(\alpha^j)^{2^8}$ or $\alpha^{j*256}$, which is the conversion factor D discussed in U.S. Pat. No. 4,975,876 that is incorporated herein by reference, to a multiplier 304.

The multiplier 304 multiplies the element $\alpha^{j*256}$ by $\alpha^j$ to produce $\alpha^{j*257}$, which is also an element of the subfield $GF(2^8)$. As discussed above, the elements of $GF(2^8)$ that are represented using the selected basis have symbols in which the highest- and lowest-order eight bits are duplicates of one another. Accordingly, the multiplier 304 need produce only the eight highest- or eight lowest-order bits of the product $\alpha^{j*}\alpha^{j*256}$. The multiplier may thus include only a portion of the computation circuitry 106 or 116 (FIG. 2).

The highest-order or the lowest-order eight bits produced by the multiplier 304 are used to enter a look-up table 306, which contains the highest or lowest-order eight bits of the multiplicative inverses of the elements of $GF(2^8)$. The table 306 thus contains 256 entries of eight bits each. The table produces the corresponding eight highest- or lowest order bits of $\alpha^{-j*257}$.

The eight bits produced by the table are supplied to the multiplier 308, which multiplies $\alpha^{-j*257}$ by $\alpha^{j*256}$ to produce the multiplicative inverse $\alpha^{-j}$. Accordingly, the multiplier loads the eight bits supplied by the table into the cyclic shift registers (FIG. 1 or 2) as the bits 15 to 8 and also the bits 7 to 0 of $\alpha^{-j*257}$. The multiplier 304 then operates as an 8-bit multiplier in the manner described above with reference to FIG. 1 or 2.

Figure 4:
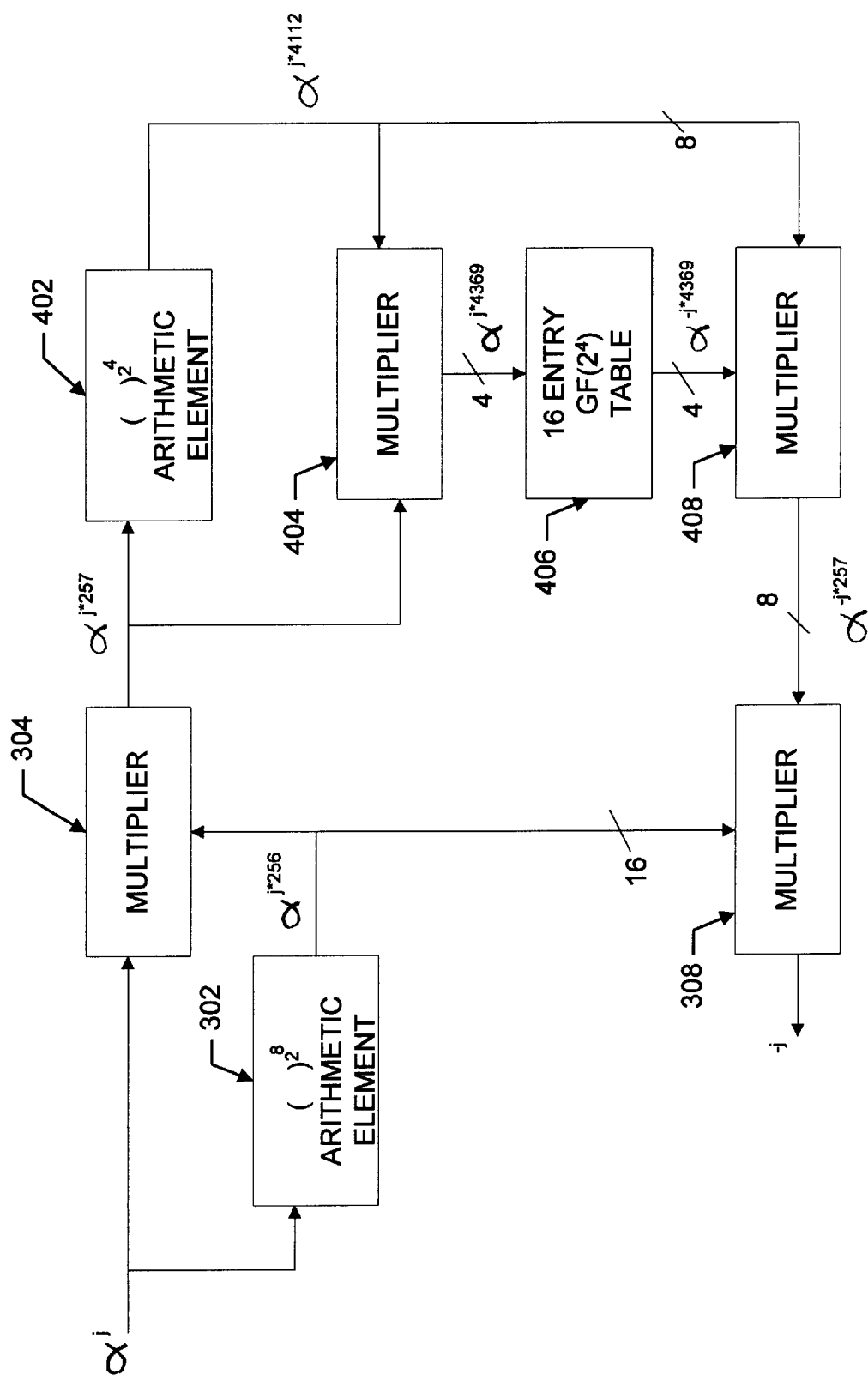
FIGS. 4 and 5 are functional block diagrams of alternative systems for determining multiplicative inverses.

Referring now to FIG. 4, an alternative circuit for producing the multiplicative inverse of $\alpha^j$ includes the hardwired arithmetic element 302 that raises $\alpha^j$ to the power 256 to produce $\alpha^{j*256}$, the multiplier 304 that multiplies $\alpha^{j*256}$ by $\alpha^j$ to produce $\alpha^{j*257}$, or least the eight highest- and lowest order bits of $\alpha^{j*257}$. The system further includes an arithmetic element 402 that is hardwired to raise $\alpha^{j*257}$ to the power $2^4$. The register thus produces a symbol that is the equivalent of cyclically rotating $\alpha^{j*257}$ by 4 bits. The hardwiring thus interchanges bits 4 to 7 with bits 0 to 3, and the "rotation" is performed with essentially no delay.

The product produced by the arithmetic element 402, namely, $\alpha^{j*257*16}$ or $\alpha^{j*4112}$ is then multiplied by $\alpha^{j*257}$ in multiplier 404 to produce the value $\alpha^{j*4369}$, which is also an element of the subfield $GF(2^4)$. The multiplier 404 operates in the manner described above with reference to FIG. 2, to produce at least the four highest-order or lowest-order bits of $\alpha^{j*4369}$.

A $2^4$ or sixteen-entry look-up table 406 contains the four highest order bits of the multiplicative inverses of the elements of $GF(2^4)$. The table, which is entered using the four bits produced by the multiplier 402, produces the four highest- or lowest order bits of $\alpha^{-j*4369}$. In the example the table produces bits 15 to 12, and these four bits are supplied to a multiplier 408, which multiplies $\alpha^{-j*4369}$ by $\alpha^{j*4112}$ to produce $\alpha^{-j*257}$. The multiplier 408 thus uses the four bits supplied by the table as bits 15 to 12 and bits 11 to 8 of $\alpha^{-j*4369}$ and uses the eight highest order bits of $\alpha^{j*4112}$ that are supplied by the arithmetic element 402 as the contents of the shift registers 12 and 14 (FIGS. 1 and 2), and produces the eight highest order bits of $\alpha^{-j*257}$. The multiplier 308 then multiplies $\alpha^{-j*257}$ by $\alpha^{j*256}$ to produce $\alpha^{-j}$, as discussed above with reference to FIG. 3.

The system of FIG. 4 produces the multiplicative inverse of an element of $GF(2^{16})$ using a look-up table 406 with only sixteen 4-bit entries. As discussed, the various multipliers, arithmetic elements and tables may instead produce and/or use the lowest order bits or other sets of repeating bits.

Figure 5:
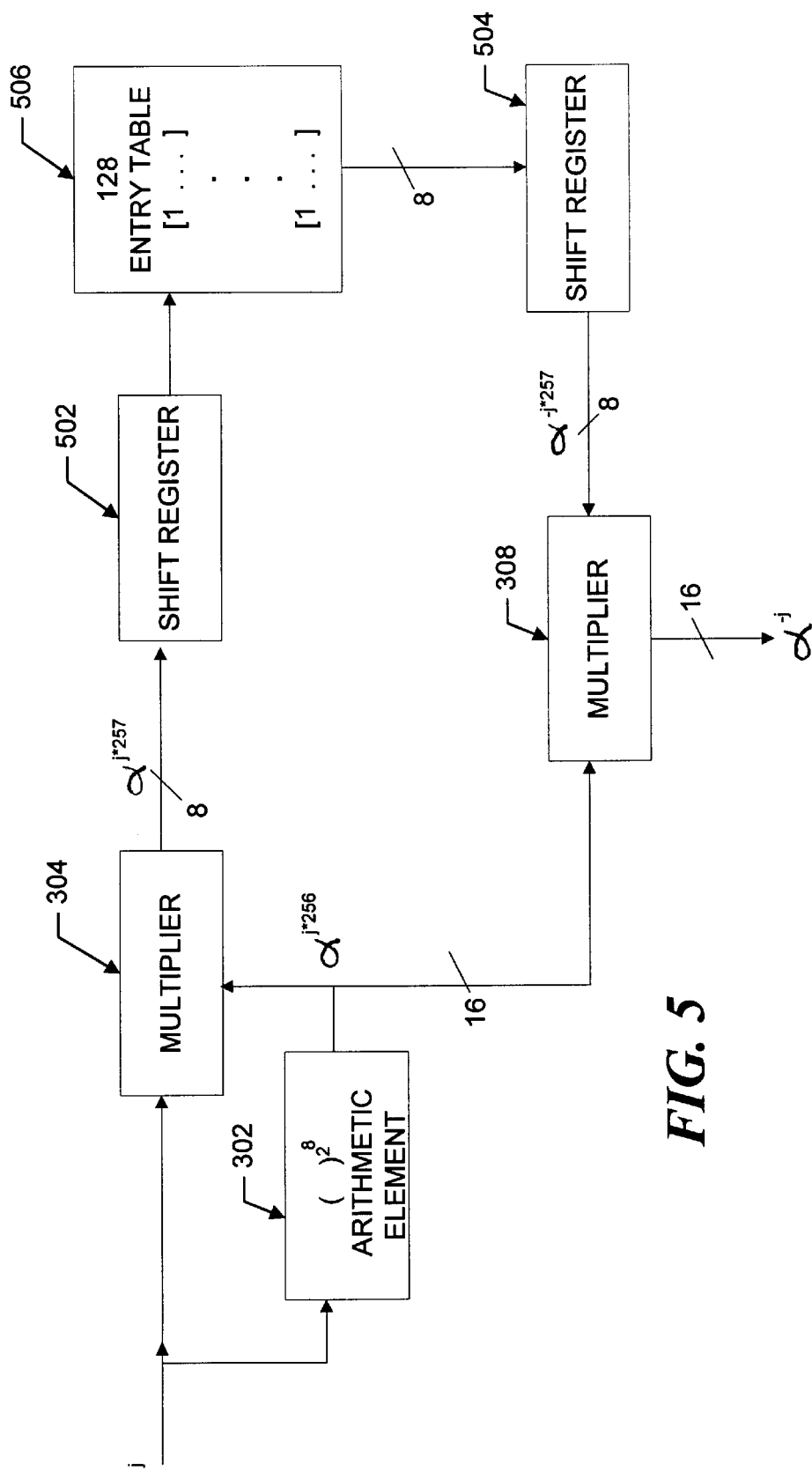

Referring now to FIG. 5, the size of the look-up tables 306 and 406 can be further reduced to 128 or 8 elements, respectively. An element P of the subfield $GF(2^k)$, for example, k=8, has a multiplicative inverse $P^{-1}=[p_{k-1}, p_{k-2} \ldots p_1, p_0]^{-1}=[t_{k-1}, t_{k-1} \ldots t_1, t_0]$. The element $(P^{-1})^2$, is a cyclic shift or $(P^{-1})^2=[[p_{k-1}, p_{k-2} \ldots p_1p_0]^{-1}]^2=[p_{k-2} \ldots p_1p_0p_{k-1},]^{-1}=[t_{k-1}, t_{k-2} \ldots t_1,t_0]^2=[t_{k-2} \ldots t_1,t_0, t_{k-1}]$.

and thus, the multiplicative inverse of a given element P can be cyclically rotated to produce the multiplicative inverses of elements that are of the form $P^{2^R}$. Accordingly, a table of the multiplicative inverses of selected elements P can be used to produce the multiplicative inverses of the elements $P^{2^R}$.

We have selected for inclusion in the table 506 the multiplicative inverses of elements that have a 1 as a leading, or highest order, coefficient. The size of the table is thus reduced by one-half. Using elements of the subfield $GF(2^8)$, table has 128 elements. Before entering the table with an element $P=A^{2^M+1}$, the system, as necessary, cyclically rotates the coefficients of P in register 502 to produce an element with a leading coefficient of 1. The shift register 502 thus cyclically rotates the elements with leading coefficients of 0 "r" times to produce $P^{2^R}$ which can then be used to enter the table 506. The table produces the multiplicative inverse $(P^{2^R})^{-1}$, which a shift register 504 then rotates to the right r bits, that is, raises to the power, to produce $$[P^{-2R}]^{\frac{1}{2^R}} = P^{-1},$$

which in the example is the multiplicative inverse of $A^{2^M+1}$. The size of the look-up table is thus a trade-off with the circuitry and time needed to rotate the elements by r bits to the left to produce an element $P^{2^R}$ with a highest-order coefficient of 1, and then to rotate $P^{-2^R}$ by r bits to the right to produce $P^{-1}$.

Alternatively, the reduced-size table may contain the multiplicative inverses of the elements of the subfield $GF(2^k)$ that have a 0 as the highest order coefficient, or those that have another bit set to a particular value.

The size of the look-up tables 306 and 406 may be even further reduced by including in the tables only the multiplicative inverses of elements P that have as the two highest order coefficients the pattern 1, 0. The table thus does not contain an entry associated with P=[0,0 . . . 0,0], which does not have a multiplicative inverse, or an entry associated with P=[1,1 . . . 1,1] which is its own multiplicative inverse. For all other elements, P=[ . . . 10 . . . ] the system cyclically rotates the corresponding symbol by "s" bits in shift register 502, that is, raises the element to the power $2^s$, to produce $P^{2^s}=[10 \ldots]$, where the two highest order coefficients are set to 1 and 0, respectively.

The system then enters the look-up table with the rotated symbol, to produce $(P^{2^s})^{-1}$. The system next rotates $(P^{2^s})^{-1}$ to the right by s bits in shift register 504, or raises $(P^{2^s})^{-1}$ to the power $\frac{1}{2^s}$ to produce $P^{-1}$. In the example using the subfield $GF(2^8)$, the table includes only 64 entries. Alternatively, the look-up table may include entries associated with elements of the subfield that have the two highest-order coefficients set to the pattern 0 and 1, respectively, or entries in which another set of two or more bits are set to a desired pattern.

Figure 6:
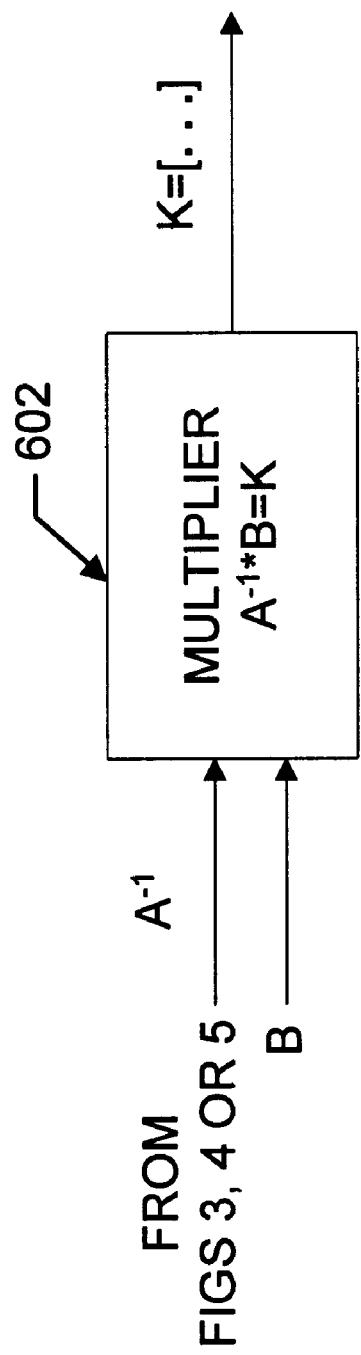
FIG. 6 is a functional block diagram of a division circuit.

Referring now to FIG. 6, the systems of FIGS. 3–5 supply the element $A^{-1}$ to a multiplier 602. The multiplier then multiplies $A^{-1}*B$ to produce $$\frac{A}{B} = K.$$

The multiplier 602 operates in the manner described above with reference to FIGS. 1 and 2.

The multiplication systems described above may be used with any Galois Field $GF(2^Q)$ by representing the elements of the field using the selected, or normal, basis in which the basis elements are squares of one another. The systems for determining the multiplicative inverses may be used with any Galois Field $GF(2^{2M})$.

What is claimed is:

1. A method for producing a product C of two elements A and B of GF $(2^Q)$, the method including the steps of:
  A. representing A and B using selected basis elements in which a given basis element is the square of the preceding basis element;
  B. combining the coefficients of A and B to produce a first set of coefficients consisting of $c_0$, $c_j$, $c_{2j}$, $c_{3j}$ . . . $c_{((Q/j)-1)j}$ of the product C, where Q/j is an integer, with each of the coefficients in the set consisting of sums of the products of coefficients of A as represented in the normal basis and respective sums of the coefficients of B as represented in the normal basis;
  C. cyclically rotating the coefficients of A and B;
  D. combining the rotated coefficients of A and B in the same manner as step b to produce a next set of coefficients $c_1$, $c_{j+1}$, $c_{2j+1}$, $c_{3j+1}$ . . . $c_{(Q/j)-1)j+1}$ of C;
  E. repeating steps C and D for the remaining sets of coefficients of C; and
  F. supplying the element c to encoding or decoding circuitry that encodes or decodes an associated codeword over $GF(2^Q)$.

2. The method of claim 1 wherein the step of representing includes converting a representation of A as a symbol using a conventional basis $\alpha^0$, $\alpha^1$, $\alpha^2$, $\alpha^3$ . . . to a representation as a symbol using the selected basis.

3. The method of claim 1 further including the step of converting the representation of C from a symbol using the selected basis to a symbol using a conventional basis $\alpha^0$, $\alpha^1$, $\alpha^2$, $\alpha^3$.

4. A method for producing an element of $GF(2^{2M})$ that is the multiplicative inverse of an element A of $GF(2^{2M})$, the method including the steps of:
  A. representing A using selected basis elements in which a given basis element is the square of the preceding basis element;
  B. cyclically rotating the coefficients of A by M bits to produce $A^{2^M}$;
  C. multiplying $A^{2^M}$ by A to produce $A^{2^M+1}$;
  D. entering a look-up table that contains the multiplicative inverses of elements of $GF(2^M)$ and producing the multiplicative inverse of $A^{2^M+1}$;
  E. multiplying the multiplicative inverse of $A^{2^M+1}$ by $A^{2^M}$ to produce the element of $GF(2^{2M})$ that is the multiplicative inverse of A; and
  F. supplying the multiplicative inverse to encoding or decoding circuitry that produces B/A as a step in encoding or decoding an associated codeword.

5. The method of claim 4 wherein the step of entering the look-up table includes using the highest or lowest order M bits of $A^{2^M}$ to enter the table.

6. The method of claim 4 wherein the steps of multiplying each include the steps of
  a. combining the coefficients of the elements to be multiplied to produce a first coefficient of the product;
  b. cyclically rotating the coefficients of the elements to be multiplied;
  c. combining the rotated coefficients to produce a next coefficient of the product; and
  d. repeating steps b and c.

7. The method of claim 4 wherein the steps of multiplying each include the steps of
  a. combining the coefficients of the elements to be multiplied to produce a first set of coefficients of the product;
  b. cyclically rotating the coefficients of the elements to be multiplied;
  c. combining the rotated coefficients to produce a next set of coefficients of the product; and
  d. repeating steps b and c.

8. The method of claim 4 wherein the step of entering the look-up table further includes the steps of.
  a. cyclically rotating the coefficients of $A^{2^M+1}$ in a first direction to raise $A^{2^M+1}$ to a power $2^s$ to produce an element that has one or more particular coefficients set to a predetermined pattern, b. entering the table with the element produced in step a to retrieve the multiplicative inverse of the element, c. cyclically rotating the retrieved multiplicative inverse in a second direction to raise the multiplicative inverse to the power $1/2^s$ to produce the multiplicative inverse of $A^{2^M+1}$.

9. The method of claim 8 wherein the steps of multiplying each include the steps of a. combining the coefficients of the elements to be multiplied to produce a first coefficient of the product;

b. cyclically rotating the coefficients of the elements to be multiplied;

c. combining the rotated coefficients to produce a next coefficient of the product; and d. repeating steps b and c.

10. The method of claim 8 wherein the steps of multiplying each include the steps of a. combining the coefficients of the elements to be multiplied to produce a first set of coefficients of the product;

b. cyclically rotating the coefficients of the elements to be multiplied;

c. combining the rotated coefficients to produce a next set of coefficients of the product; and d. repeating steps b and c.

11. The method of claim 4 wherein the step of entering the look-up table further includes the steps of:

a. cyclically rotating the coefficients of the element $A^{2^M+1}$ to raise the element to a power of 2, b. multiplying the result by $A^{2^M+1}$ to produce an element of a smaller Galois Field, c. entering a table that includes the multiplicative inverses of elements of the smaller Galois Field, d. multiplying the result of step c by the result of step a to produce the multiplicative inverse of $A^{2^M+1}$.

12. The method of claim 11 wherein the steps of multiplying each include the steps of a. combining the coefficients of the elements to be multiplied to produce a first coefficient of the product;

b. cyclically rotating the coefficients of the elements to be multiplied;

c. combining the rotated coefficients to produce a next coefficient of the product; and d. repeating steps b and c.

13. The method of claim 11 wherein the steps of multiplying each include the steps of a. combining the coefficients of the elements to be multiplied to produce a first set of coefficients of the product;

b. cyclically rotating the coefficients of the elements to be multiplied;

c. combining the rotated coefficients to produce a next set of coefficients of the product; and d. repeating steps b and c.

14. The method of claim 4 wherein the step of representing includes converting a representation of A as a symbol using a conventional basis $\alpha^0, \alpha^1, \alpha^2, \alpha^3 \ldots$ to a representation as a symbol using the selected basis.

15. The method of claim 4 further including the step of converting the representation of A as a symbol using the selected basis to a symbol using a conventional basis $\alpha^0, \alpha^1, \alpha^2, \alpha^3 \ldots \alpha^{2^{M-1}}$.

16. A system for multiplying two elements A and B of GF $(2^{2M})$ that are represented using a selected basis in which the basis elements are squares of one another, the system including:

A. a first shift register for holding and cyclically rotating the coefficients of A;

B. a second shift register for holding and cyclically rotating the coefficients of B;

C. a computation circuit for producing sets of coefficients $c_0, c_j, c_{2j}, c_{3j} \ldots c_{(Q/j)-1)j}$ of the product C=A*B as sums of terms that are products of the coefficients of A and respective sums of the coefficients of B;

the first and second shift registers providing the coefficients of A and B to the computation circuit for the computation of the first set of coefficient and providing to the computation circuit, for the computation of the remaining sets, coefficients of A and B that have been cyclically shifted by appropriate numbers of bits.

17. A system for producing an element of GF $(2^{2M})$ that is the multiplicative inverse of an element A of $GF(2^{2M})$ which is represented using a selected basis in which the basis elements are squares of one another, the system including:

A. an arithmetic element hardwired to provide $A^{2^M}$ as the element A cyclically shifted by M bits;

B. a first multiplier for multiplying $A^{2^M}$ by A to produce $A^{2^M+1}$;

C. a look-up table that includes the multiplicative inverses of elements of $GF(2^M)$, the system entering the look-up table with selected coefficients of $A^{2^M+1}$; and D. a second multiplier for multiplying the multiplicative inverse retrieved from the table by $A^{2^M}$ to produce the element that is the multiplicative inverse of A.

18. The system of claim 17 wherein one or both of the first and second multipliers includes a. a first shift register for holding and cyclically rotating the coefficients of a first element $A^{2^{M'}}$;

b. a second shift register for holding and cyclically rotating the coefficients of a second element that is a power of A;

c. a computation circuit for producing a coefficient of the product C as a sum of terms that are combinations of the coefficients of the first and second elements;

the first and second shift registers providing the coefficients to the computation circuit for the computation of the coefficient $c_0$ of C and providing to the computation circuit for the computation of coefficients $c_j$ coefficients of the first and second elements that have been cyclically shifted by j bits.

19. The system of claim 18 wherein the computation circuit includes a plurality of computation sub-circuits that each produce an associated coefficient of the product, the plurality of sub-circuits producing in parallel a corresponding set of coefficients of the product.

20. The system of claim 17 wherein the system further includes i. an arithmetic element for providing the element $A^{2^M+1}$ raised to a power $2^{M/2}$ as the element cyclically shifted by corresponding M/2 bits, ii. a third multiplier for multiplying the element $(A^{2^M+1})^{2^{M/2}}$ by $A^{2^M+1}$ to produce an element of a smaller Galois Field, iii. the look-up table contains the multiplicative inverses of elements of the smaller Galois Field and is entered using selected coefficients of the element of the smaller Galois Field, and iv. a multiplier for multiplying the multiplicative inverse produced by the table by the element $A^{2^M+1}$ raised to the power $2^{M/2}$.

21. The system of claim 17 wherein the system further includes:

d. a first shift register for cyclically rotating the coefficients of $A^{2^M+1}$ in a first direction to raise $A^{2^M+1}$ to a power $2^s$ and produce an element that has one or more particular coefficients set to a predetermined pattern, e. the look-up table contains the multiplicative inverses of the elements that have the particular coefficients set to the predetermined pattern, and the system enters the table using selected coefficients of $A^{2^M+1}$ raised to the power $2^s$, and f. a second shift register for cyclically rotating the coefficients of the element retrieved from the table to raise the element to the power $1/2^s$ and produce the multiplicative inverse of $A^{2^M+1}$.

22. A system for producing an element of $GF(2^{2M})$ that is the quotient of B/A where A and B are elements of $GF(2^{2M})$ that are represented using a selected basis in which the basis elements are squares of one another, the system including:

A. an arithmetic element hardwired to provide $A^{2^M}$ as the element A cyclically shifted by M bits;

B. a first multiplier for multiplying $A^{2^M}$ by A to produce $A^{2^M+1}$;

C. a look-up table that includes the multiplicative inverses of elements of $GF(2^M)$, the system entering the look-up table with selected coefficients of $A^{2^M+1}$.

D. a second multiplier for multiplying the multiplicative inverse retrieved from the table by $A^{2^M}$ to produce the element that is the multiplicative inverse verse of A; and E. a third multiplier for multiplying B and the multiplicative inverse of A.

23. The system of claim 22 wherein one or more of the multipliers include a. a first shift register for holding and cyclically rotating the coefficients of a first element;

b. a second shift register for holding and cyclically rotating the coefficients of a second element;

c. a computation circuit for producing a coefficient of the product C as a sum of terms that are combinations of the coefficients of the first and second elements;

the first and second shift registers providing the coefficients to the computation circuit for the computation of the coefficient $c_0$ of C and providing to the computation circuit for the computation of coefficients $c_j$ coefficients of the first and second elements that have been cyclically shifted by j bits.

24. The system of claim 23 wherein the computation circuit includes a plurality of computation sub-circuits that each produce an associated coefficient of the product, the plurality of sub-circuits producing in parallel a corresponding set of coefficients of the product.

25. The system of claim 22 wherein the system further includes i. an arithmetic element for providing the element $A^{2^M+1}$ raised to a power $2^{M/2}$ as the element cyclically shifted by corresponding M/2 bits, ii. a third multiplier for multiplying the element $(A^{2^M+1})^{2^{M/2}}$ by $A^{2^M+1}$ to produce an element of a smaller Galois Field, iii. the look-up table contains the multiplicative inverses of elements of the smaller Galois Field and is entered using selected coefficients of the element of the smaller Galois Field, and iv. a multiplier for multiplying the multiplicative inverse produced by the table by the element $A^{2^M+1}$ raised to the power $2^{M/2}$.

26. The system of claim 25 wherein one or more of the multipliers include a. a first shift register for holding and cyclically rotating the coefficients of a first element;

b. a second shift register for holding and cyclically rotating the coefficients of a second element;

c. a computation circuit for producing a coefficient of the product C as a sum of terms that are combinations of the coefficients of the first and second elements;

the first and second shift registers providing the coefficients to the computation circuit for the computation of the coefficient $c_0$ of C and providing to the computation circuit for the computation of coefficients $c_j$ coefficients of the first and second elements that have been cyclically shifted by j bits.

27. The system of claim 26 wherein the computation circuit includes a plurality of computation sub-circuits that each produce an associated coefficient of the product, the plurality of sub-circuits producing in parallel a corresponding set of coefficients of the product.

28. The system of claim 22 wherein the system further includes:

d. a first shift register for cyclically rotating the coefficients of $A^{2^M+1}$ in a first direction to raise $A^{2^M+1}$ to a power $2^s$ and produce an element that has particular coefficients set to a predetermined pattern, e. the look-up table contains the multiplicative inverses of the elements that have the particular coefficients set to the predetermined pattern, and the system enters the table using selected coefficients of $A^{2^M+1}$ raised to the power $2^s$, and f. a second shift register for cyclically rotating the coefficients of the element retrieved from the table to raise the element to the power $1/2^s$ and produce the multiplicative inverse of $A^{2^M+1}$.

29. The system of claim 28 wherein one or more of the multipliers include a. a first shift register for holding and cyclically rotating the coefficients of a first element;

b. a second shift register for holding and cyclically rotating the coefficients of a second element;

c. a computation circuit for producing a coefficient of the product C as a sum of terms that are combinations of the coefficients of the first and second elements;

the first and second shift registers providing the coefficients to the computation circuit for the computation of the coefficient $c_0$ of C and providing to the computation circuit for the computation of coefficients $c_j$ coefficients of the first and second elements that have been cyclically shifted by j bits.

30. The system of claim 29 wherein the computation circuit includes a plurality of computation sub-circuits that each produce an associated coefficient of the product, the plurality of sub-circuits producing in parallel a corresponding set of coefficients of the product.

* * * * *